Patented Mar. 30, 1937

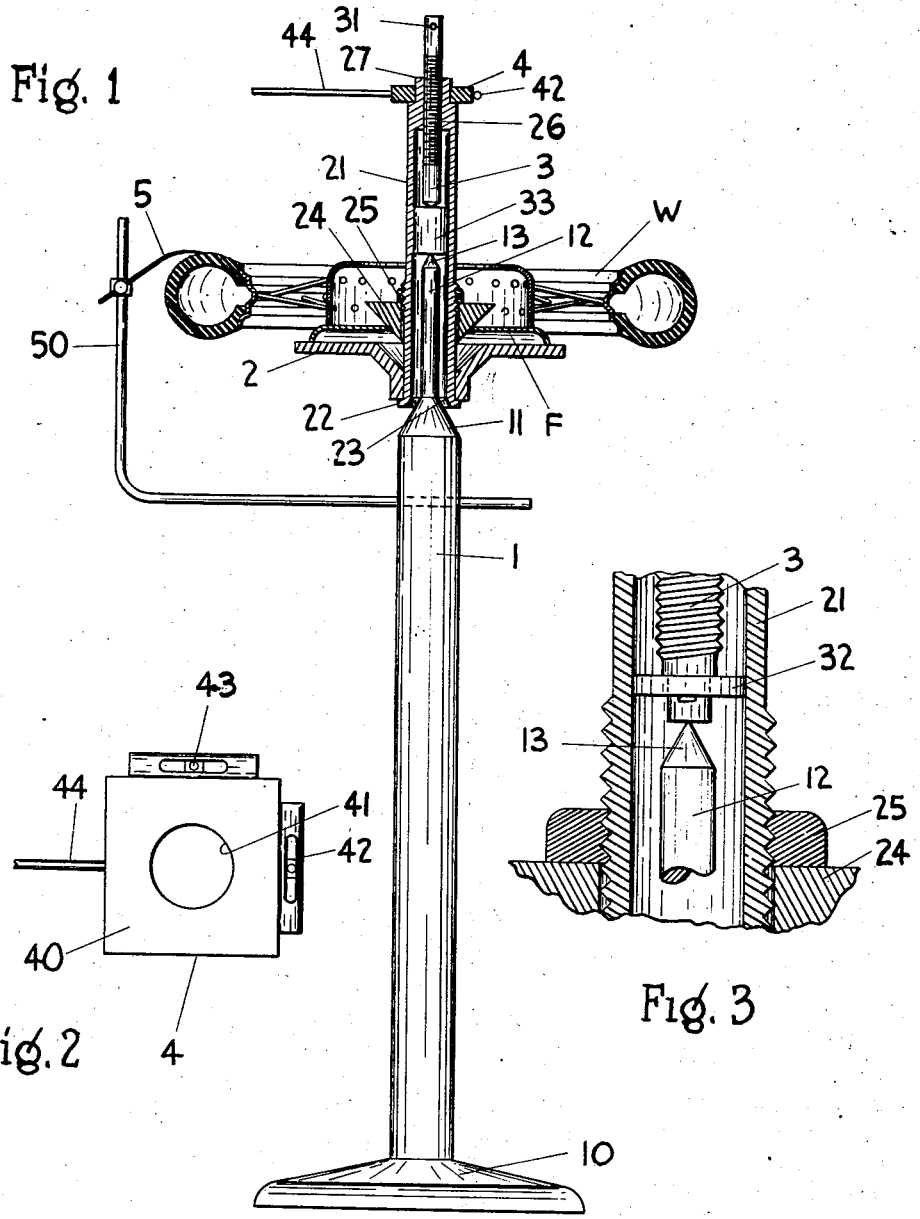

2,075,421

UNITED STATES PATENT OFFICE 2,075,421

WHEEL-BALANCER—STATIC TYPE

Claude C. Bennett, South Bend, Ind., assignor to A. E. Feragen, Inc., Seattle, Wash., a corporation of Washington Application January 14, 1935, Serial No. 1,688

5 Claims. (Cl. 73—51)

My invention relates to wheel balancing stands, particularly such as are intended for the balancing of automobile wheels, which must be balanced carefully to avoid shimmy and like disturbances in the steering of the car, and undue tire wear.

One of the objects of the present invention is to devise a wheel balancing stand which is adaptable to use with various types of automobile wheels, and which must therefore have a small axial part which extends through the central aperture in the wheel, after the same has been removed from the spindle assembly and hub.

A further object is to provide means which are accessible from above the wheel to raise the wheel and its support upon a fulcrum, so that it may swing free and thereby show the presence or absence of unbalance.

A further object is to provide in such a wheel balancing stand a convenient means for checking the wobble of the wheel, whether or not it is balanced.

A further object is to provide means whereby the location of the point of maximum or minimum unbalance may be pointed out definitely and accurately.

A further object is to provide such a wheel balancing stand which is simple yet rugged in construction, and which can be made inexpensively.

With the above and other objects in view, as will appear hereafter, my invention comprises the novel parts, and the novel combination and arrangement thereof, as shown in the accompanying drawing, described in this specification, and as will be more particularly pointed out by the claims which terminate the same.

In the accompanying drawing I have shown my invention embodied in forms which are at present preferred by me.

Figure 1 is a general axial sectional view through the wheel balancing stand.

Figure 2 is a plan view of the indicating and pointing device, which may be employed in conjunction with the stand.

Figure 3 is an enlarged axial section of a modified detail of the fulcrum arrangement.

The device consists of four principal parts—the stand 1, the wheel support 2, the vertical adjusting means 3, and the indicating device 4.

The stand may conveniently consist of a post supported upright in a suitable base 10, and having at its upper end a true surface such as a conical seat 11. Above this surface 11 the stand may be provided with a reduced extension 12 terminating in a point 13 which forms a fulcrum. The fulcrum may take any suitable form.

The wheel supporting element may consist of a table 2, with which is associated an axially disposed, upwardly extending sleeve 21, or any equivalent element, carrying a bearing piece, hereafter described, to rest upon the universal fulcrum 13, thereby to support the wheel support from a point close to but somewhat spaced above the combined center of gravity of the wheel support and a wheel W centered thereon. The sleeve 21 need not be as large in proportion to other parts as it is shown in the drawing, and preferably is not, being exaggerated in the drawing for greater convenience in illustration. It should be at least sufficiently small in diameter that it will pass through the center opening in the flange F of any standard automobile wheel, and preferably is sufficiently small to pass through the spindle or axle bearing in any standard automobile hub. If it is 1⅜ of an inch in outside diameter, which is entirely feasible, it will accommodate any standard automobile hub (and it is good practice to balance a wheel with the hub in place), but if it is 1⅛ inches in outside diameter it will accommodate all wheels and hubs except a few which may be disregarded. In inside diameter the sleeve 21 needs only to be large enough to fit over the reduced extension 12, and to have sufficient clearance to permit some movement transversely with respect thereto.

The sleeve 21 may conveniently be flanged at 22 to support the table 2, and may have a conical surface 23 formed at its lower end to rest upon the coned surface 11 previously referred to. The sleeve may be exteriorly threaded, whereby a cone 24, having an aperture of a size to pass over the threads, may hold the wheel to the table 2 and center it thereon by engagement within the flange F of the wheel, being held in position by a nut 25. Thus held, the wheel is coaxial with the table and sleeve, and its plane, if the wheel is true, is precisely normal to the axis of the wheel-supporting element.

The screw 3 is threaded at 26 in the upper part of the sleeve 21, and may be provided with a hole 31 for the reception of a cross pin, whereby it may be turned. The lower end of this screw may be brought to bear directly upon the fulcrum 13, as shown in Figure 3, being guided by a collar 32 engaging the inside of the bore of the sleeve, in which case the end of the screw would be hardened, as would the fulcrum 13, but preferably the screw bears upon a block 33, slidably received in the bore of the sleeve and resting upon the fulcrum 13. This block, at least in its bearing portions, may be hardened to prevent wear.

The wheel support 2 may normally rest upon the coned surface 11, the screw 3 being retracted to permit this, and while the support is thus firmly supported a wheel may be placed in position upon it, in the manner described. Now the screw is threaded into the sleeve, whereupon the wheel support is lifted from the conical surface 11 and is supported upon the fulcrum 13. If the wheel is unbalanced, the heavy side will drop, and the light side will rise. The rise or fall of the wheel may be indicated by such a device as is indicated generally by the numeral 4, which, as shown, consists of a balanced block 40 having a central aperture 41 which may fit about a reduced cylindrical portion 27 at the upper end of the sleeve, the block bearing bubble tubes 42 and 43, disposed at right angles to each other, and these bubble tubes will indicate if the block, and consequently the wheel support, is out of balance. In addition a pointer 44 may be carried by the block 40, and this pointer may be moved around the portion 27 of the sleeve until it points toward that part of the wheel which is raised or which has dropped, thereby indicating either the point of least weight or the point of most weight, as the case may be.

In addition I may employ a contact finger 5 carried upon an arm 50 supported from the stand, which will also give an indication of which part of the wheel has risen and which has dropped. This contact finger 5 may also serve to indicate wobble in the wheel, for as the wheel is slowly turned, supported either on the conical surface 11 or upon the fulcrum 13, the pointer 5 will indicate which part of the wheel is high and which part is low. If the wheel is supported on the fulcrum 13 during this operation it should be raised but slightly from the conical surface 11, so that unbalance will not affect the indication of wobble, and the conical surface will serve to steady the wheel support and prevent its wobbling as the wheel is rotated.

What I claim as my invention is:

1. A wheel balancing stand comprising a wheel support, a stand whereon the support may rest, terminating at its upper end in a universal fulcrum, a sleeve adapted to pass through the axial openings of a wheel to be balanced, axially disposed and projecting upwardly from the wheel support, a bearing member carried by said sleeve and adapted to support the sleeve and a wheel thereon from said fulcrum, whereby tilting of the support will disclose unbalance of such a wheel, a cylindrical post axially disposed at the upper end of said sleeve, a block having a hole coaxial with its center of balance, and fitting said post, a pointer projecting laterally from said block, and two bubble tubes carried by said block, and disposed substantially at right angles to each other in a normally horizontal plane.

2. The combination of claim 1, wherein the pointer is disposed parallel to one bubble tube, and at right angles to the other.

3. A wheel balancing machine comprising a stand, a horizontally disposed support to carry a wheel to be balanced, a fulcrum carried by said stand adapted to engage said support at the support's axis for universal tilting movement thereof, a pointer projecting laterally from the axis of said support and rotatable about such axis relatively to said support, and gravity-actuated means mounted to rotate with said pointer to indicate accurately, for all pointer positions, the tilt from vertical of the plane defined by said pointer and said support's axis.

4. A wheel balancing machine comprising a stand, a horizontally disposed support to carry a wheel to be balanced, a fulcrum carried by said stand adapted to engage said support at the support's axis for universal tilting movement thereof, a pointer mounted upon and projecting laterally from the axis of said support, to tilt therewith, gravity-actuated means for indicating accurately the tilt from vertical of the plane defined by said pointer and said support's axis, and additional gravity-actuated means to indicate the direction of tilt, in said plane, of the support's axis.

5. A wheel balancing machine comprising a stand, a horizontally disposed support to carry a wheel to be balanced, a fulcrum carried by said stand adapted to engage said support at the support's axis for universal tilting movement thereof, a pointer projecting laterally from the axis of said support and rotatable about such axis relatively to said support, a bubble tube mounted to rotate with said pointer to be disposed, for all pointer positions, normal to the plane defined by said pointer and said support's axis, and a second bubble tube disposed at an angle to said first bubble tube and normal to said support's axis.

CLAUDE C. BENNETT.